United States Patent [19]

Meyer et al.

[11] Patent Number: 5,412,300
[45] Date of Patent: May 2, 1995

[54] NUMERICAL CONTROL DEVICE AND METHOD FOR CONTROL OF MOVEMENT OF A TOOL

[75] Inventors: Piotr J. Meyer, Szczecin, Poland; Noel Ripoll-Ensenat, Eindhoven, Netherlands

[73] Assignee: Grundig Aktiengesellschaft, Furth, Germany

[21] Appl. No.: 52,309

[22] Filed: Apr. 23, 1993

[30] Foreign Application Priority Data

Apr. 23, 1992 [EP] European Pat. Off. ........... 92201145

[51] Int. Cl.⁶ .............................................. G05B 19/18
[52] U.S. Cl. ........................... 318/568.11; 318/568.15; 318/570; 318/573; 901/14; 364/474.29; 364/474.31
[58] Field of Search ................ 318/560, 568.1, 568.11, 318/568.15, 568.19, 568.22, 568.23, 570, 572, 573, 574; 364/474.31, 474.29, 517, 518, 474.32, 525; 901/14, 16, 3; 73/849; 395/142; 128/696

[56] References Cited

U.S. PATENT DOCUMENTS

| | | | |
|---|---|---|---|
| 4,648,024 | 3/1987 | Kato et al. | 318/573 |
| 4,760,548 | 7/1988 | Baker et al. | 364/718 |
| 4,794,540 | 12/1988 | Gutman et al. | 364/474.29 |
| 4,797,836 | 1/1989 | Witek et al. | 395/142 |
| 4,835,710 | 5/1989 | Schnelle et al. | 901/14 |
| 4,858,140 | 8/1989 | Bühler et al. | 318/573 |
| 4,929,079 | 5/1990 | Delfour et al. | 364/525 |
| 5,028,855 | 7/1991 | Distler et al. | 318/568.13 |
| 5,156,053 | 10/1992 | Shiraishi et al. | 73/849 |
| 5,269,313 | 12/1993 | De Pinto | 128/696 |
| 5,276,790 | 1/1994 | Lo et al. | 395/142 |

FOREIGN PATENT DOCUMENTS 0384925 9/1990 European Pat. Off. .

OTHER PUBLICATIONS

Tiller et al, "Offsets of Two–Dimensional Profiles" IEEE CG&A 1984 pp. 36–47.
B. Pham, Offset curves and surfaces: a brief survey, Computer Aided Design, vol. 24, No. 4, Apr. 1992, London GB, pp. 223–229.

Primary Examiner—John W. Cabeca
Attorney, Agent, or Firm—Kane Dalsimer Sullivan Kurucz Levy Eisele and Richard

[57] ABSTRACT

A numerical control device is arranged to calculate offset curves and generate signals for the movement of tools along the offset curves. The offset curves are derived from contour data, preferably in the form of cubic splines, describing the shape of a workpiece to be machined and from an offset value. By using Hermite's formula for approximation of the offset curves by splines, the number of spline segments is minimized while limiting the deviation between the splines and the offset curve to a preset tolerance value. Even when using moderate computing power, the calculation of the splines will in most circumstances be fast enough to be performed on-line without slowing down the throughput of the machining apparatus.

5 Claims, 2 Drawing Sheets

NUMERICAL CONTROL DEVICE AND METHOD FOR CONTROL OF MOVEMENT OF A TOOL

BACKGROUND OF THE INVENTION

The invention relates to a numerical control device for control of movement of a tool along a path, the numerical control device including an input for entering path data describing the path, a conversion device for converting the path data to control signals for steering the tool, and an output for transfer of the control signals to a steering device to which the tool is attached. The invention relates also to a method for determining a path of movement for a tool. A tool is, for example, a milling tool of a machining apparatus such as a numerical controlled milling-machine or a lathe or it is part of a robot. The invention can also be applied in techniques like laser or electron-discharge machining.

A device and method for motion control of a machine-tool or robot is known from EP-A 0 384 925, wherein a path of movement for a machine-tool or a robot is approximated by a plurality of spline segments, each spline being parameterized by a third order polynomial. This allows a considerable reduction of the amount of data needed to describe the path of movement. The use of third order polynomials allows the approximation curve to be continuous and smooth. The polynomials are constructed from four points selected from the path to be followed. Maximum reduction of the amount of data is desirable in order to obtain fast processing in the controller of the machining apparatus or robot. This is obtained by making the spline segments to extend over a portion of the path of movement as long as possible without the approximated curve deviating more from the desired path than a predetermined tolerance. When a spline segment is extended it is parameterized by using points farther apart and a number of intermediate points are selected, at which points the deviation is calculated. If an intermediate point is found at which the deviation exceeds the tolerance, the spline segment has been extended too far and a new spline segment is started.

A disadvantage of the known method is that it provides the controller of the machining apparatus or robot with data approximating the actual path of movement of a tool. Often this path is machine dependent, for example, in case of a milling-machine or lathe, the radius of the milling tool may vary and even, due to wear, not be identical for similar tools or for the same tool at different times. For controlling a robot, the path of movement may be determined by the end points and the requirement to avoid any intermediate obstacles while displacing objects of various size and shape. The exact locations of the end point and the distance of the moving robot clamp to an obstacle may depend on the shape and/or orientation of the object. The known method requires the recalculation of the spline segments for each different situation starting from a large number of points describing the actual path. As the calculation is an iterative process, requiring several approximations with spline segments of different lengths, it is time-consuming or requires significant resources in terms of computer capacity for performing the calculation. Consequently, it is unsuitable to be performed in the numerical control device during a machining operation. For economical reasons a numerical control device cannot be provided with a large computer, nor is it acceptable to stop a milling operation for calculating a path of movement.

SUMMARY OF THE INVENTION

It is, inter alia, an object of the invention to provide a numerical control device for which it is not necessary for each individual machining operation or object displacement to calculate a spline approximation beforehand. It is also an object of the invention to provide a method for determining a path of movement of a tool that is sufficiently fast and requires so few calculation resources that it can be implemented in a numerical control device.

To this end, a numerical control device according to the invention is characterized in that the conversion device includes a calculation device arranged for receiving the path data, at least partially, as contour data describing a contour to which the path has an offset determined by an offset value, and for parameterizing the path by a plurality of spline segments, each spline segment having end points of which the positions and slopes are derived from the contour data and the offset value, and in that the conversion device further includes a control signal generation device for generating the control signals for steering the tool along a path determined by the spline segments. For a machining apparatus the contour data describes the shape of a workpiece or object to be made and for a robot this data describes an edge of a forbidden area. The radius of the individual milling tool or the size of an object to be displaced is comprised in the offset value. As at each individual point of the contour both slope and position of the path of movement, i.e. an offset curve keeping a constant geometrical distance to the contour, can easily be derived from the contour data, a complete description of the path is provided and all information is available that is necessary to parameterize spline segments approximating the offset curve.

A numerical control device according to the invention is further characterized in that the calculation device is arranged for receiving the contour data in the form of a differentiable function or a plurality of differentiable functions and that the calculation device is arranged for approximating the path in a spline segment by at least one polynomial according to Hermite's formula. An approximation according to Hermite's formula provides a polynomial which satisfies collocation and first degree osculation, i.e. matching of both function value and derivative is assured at the points joining the spline segments of the path of movement. In order to assure matching of the derivative, the contour data must be in a form which allows the derivative of the contour to be found. Providing the contour data as a function to be described with a few parameters has the further advantage of reduction of the amount of data necessary for describing the contour.

An important advantage of the use of Hermite's formula in order to approximate the path of movement in each spline segment, is that the maximum deviation between the desired path of movement, as determined by the contour data and the offset value, and the resulting polynomial approximating that path can be estimated directly. Accordingly, an embodiment of the numerical control device according to the invention is characterized in that the calculation device is arranged for receiving the contour data in the form of parameters describing a multiple differentiable function or a plurality of such functions and in that the calculation device is arranged for determining, from the contour data and offset value, an estimated maximum error $\epsilon_{max}$ between the path and the approximation thereof by a polynomial in a spline segment and for reducing the length of a spline segment if the estimated maximum error exceeds a predetermined tolerance. As will be discussed hereinafter, the estimation of the deviation requires the $(2n+2)^{nd}$ derivative of the functions describing the contour if the path is approximated by a polynomial of order $(2n+1)$. In this embodiment, the calculation device can be arranged, for example, for starting with a single spline segment or a small number of long spline segments, estimating the deviation in each spline segment and dividing those spline segments in two shorter segments for which the estimated deviation exceeds the preset tolerance value. Of course, not only polynomials according to Hermite's formula, but any other method of approximation having the same quality of providing an approximative error can be used as well.

An alternative embodiment of the numerical control device according to the invention is characterized in that the calculation device is arranged for receiving the contour dam in the form of parameters describing a multiple differentiable function or a plurality of such functions and in that the calculation device is arranged for determining, from the contour data and the offset value, an approximative error function $(\lambda(u))$ and in that the calculation device is further arranged for determining spline segment lengths such that each spline segment has an estimated maximum error not exceeding the value of the maximum error function in a portion of the path approximated by the spline segment. It will be shown that for a preset tolerance value an approximative error function can be derived which indicates for a spline segment of given start and end points whether the maximum deviation in that specific spline segment may exceed the tolerance value. According to this embodiment the approximative error function is used to assure that in none of the spline segments the tolerance value is exceeded.

This embodiment of the numerical control device according to the invention can be further characterized in that the calculation device is arranged for determining the length of spline segments such that for at least one spline segment the estimated maximum error is substantially equal to the value of the maximum error function in a portion of the path approximated by the at least one spline segment. The approximative error function is used to minimize the number of spline segments by choosing the start and end points of the segments such that the estimated maximum deviation in a spline segment is at most equal to the preset tolerance. This embodiment allows the control of the tool to proceed for a spline segment simultaneous with the calculation of the parameters describing the next spline segment.

Normally, it does not occur that a division in spline segments results in which all segments actually have at least one point of which the estimated deviation is equal to the preset tolerance. Therefore, a further embodiment is characterized in that the calculation device is arranged for determining the length of spline segments such that for each spline segment the ratio between the estimated maximum error and the value of the maximum error function in a portion of the path approximated by the spline segment is substantially equal. The estimated maximum deviation is about equal in all spline segments and no spline segment has an estimated maximum deviation equal to the preset tolerance. The procedure according to this embodiment can be applied if the calculation proceeds fast enough for determining a number of spline segments prior to starting the movement of the tool along the path described by the first of the number of spline segments.

A preferred embodiment of the numerical control device according to the invention is characterized in that the calculation device is arranged for receiving the function or functions describing the contour in the form of parameters of third order polynomials. In this way the contour data may take the form of spline segments in a format conventional for numerical control devices.

Preferably, the numerical control device according to the invention is characterized in that the calculation device is arranged for approximating the path of movement by cubic splines. As the calculation of the estimated maximum error and of the approximated error function requires the use of higher order derivatives, programming is simplified and the necessary resources for performing the calculation, such as memory, can be limited by using simple functions that meet the requirements of continuity and smoothness.

The invention further relates to a numerically controlled machining apparatus for machining of a workpiece according to a predetermined geometry, the machining apparatus being provided with a numerical-control device as described hereinbefore. The input to be provided to such a machining apparatus or lathe consists of function definitions and parameters describing the desired geometry. The conversion of the contour description to a movement of the milling tool and/or the workpiece along offset curves is performed by the numerical control device fast enough not to slow down the machining apparatus.

The invention also relates to a method for determining a path of movement of a numerically controlled tool. According to the invention the method comprises the steps of reading path data describing the path; converting the path data into control signals for steering the tool, and transferring the control signals to the tool and is thereby characterized in that the path data represent, at least partially, a parameterization of a contour to which the path of movement has to maintain a distance determined by an offset value, in that the conversion from path data to control signals comprise the parameterization of the path by a plurality of spline segments, each spline segment having end points of which the positions and the slopes are derived from the contour parameterization and the offset value and in that the control signals are obtained from the spline parameterisations. Preferably the method is further characterized in that the provision of contour data as parameters describing a differentiable function or a plurality of differentiable functions and that the path in each spline segment is approximated by a polynomial according to Hermite's formula.

These and other, more detailed, aspects of the invention will now be elucidated by way of example with reference to the accompanying drawings.

BRIEF DESCRIPTION OF THE DRAWINGS

The drawings show in

DETAILED DESCRIPTION OF THE PREFERRED EMBODIMENTS

Figure 1:
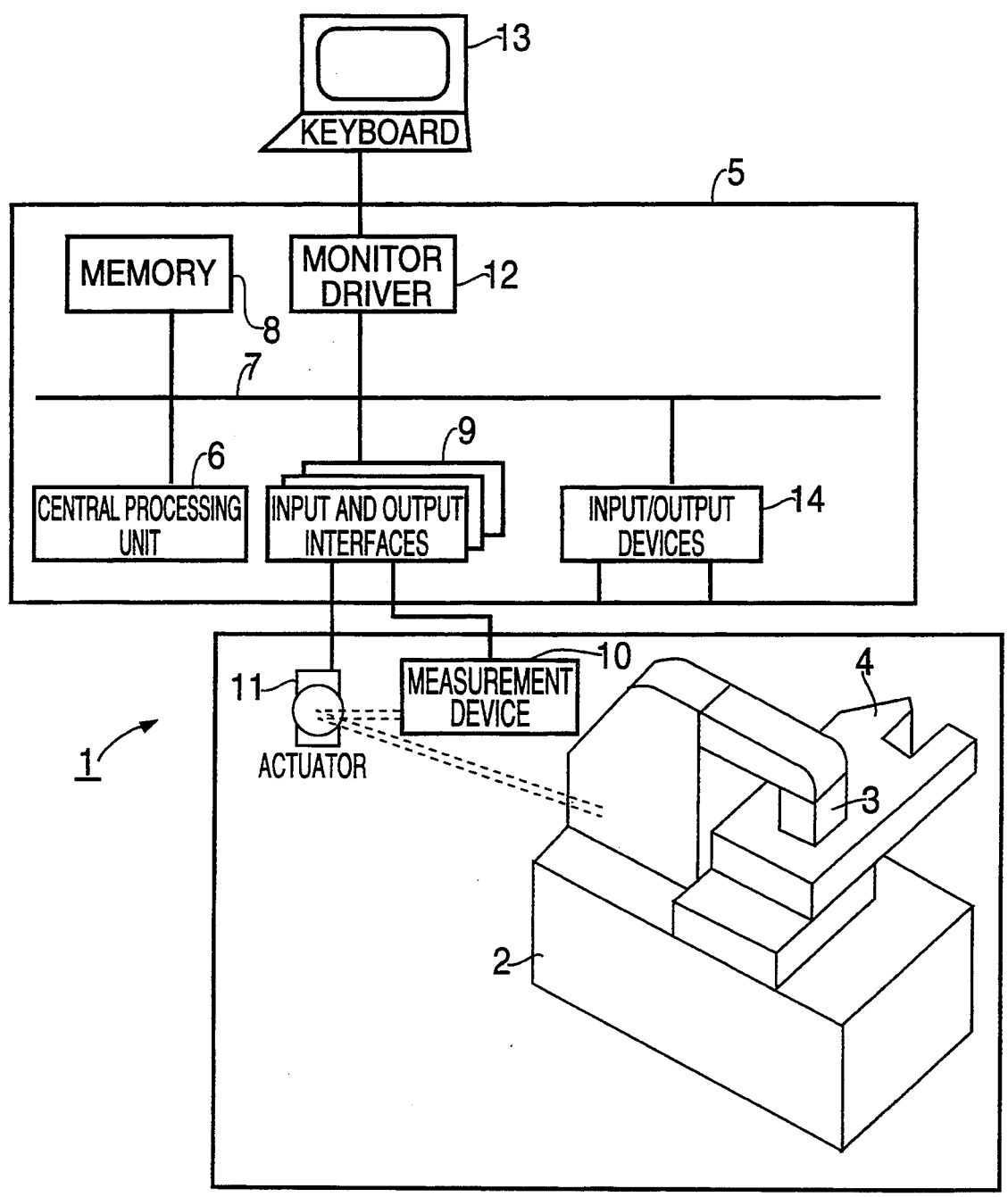
FIG. 1 diagrammatically shows a machining apparatus comprising a numerical control device according to the invention.

In FIG. 1 a machining apparatus 1 is shown diagrammatically. The shown apparatus includes a milling-machine 2 with a tool 3 for machining a workpiece 4. The machining apparatus 1 further include a control device 5 for controlling the movements of the tool 3 relative to the workpiece 4. The control device 5 includes a central processor unit 6 connected for the exchange of dam, via an internal bus 7, with other components such as a memory 8, a number of input and output interfaces 9 for the input of signals from measurement device 10 and for output of control signals to an actuator 11 like a motor. The measurement device 10 is arranged, inter alia, to measure quantities like axis position and rotation velocity which are used in an incremental control system for controlling such quantities. Such control system can comprise a program stored in the memory 8 and executed by the central processor unit 6, in a manner usual for a machining apparatus. The control device 5 also includes a monitor driver 12 for control of a monitor and a keyboard 13, further input and output devices 14 for input and output of signals further occurring in a machining apparatus, such as signals from end-position switches, and signals transported from and to reading and punching devices, not shown, for reading and punching, respectively, of paper tape with data for a workpiece program. Other devices that may be coupled to the control device 5 are, for example, a diskette station as an alternative for the paper tape reader and punch, a printer and an external computer system or a connection with a CAD (Computer Aided Design) system for direct supply of data describing the machining operation to be performed on the workpiece. The required data transport occurs for example via a V24-interface.

According to the present invention the data supplied to the numerical control device 5, via a paper tape reader, a diskette station or by a wired data connection from a computer or CAD system, includes contour data of the workpiece. An offset value is entered via the same source, and is internally available in the control device 5 or can be obtained from the machining apparatus, for example via measuring device 10. From the entered contour data, the position and slope at a number of points of an offset curve, i.e. a curve following the contour while maintaining a distance equal to the offset value, is determined. The offset curve is the path of the tool of the machining apparatus and the contour is the shape of the workpiece to be obtained.

In general, a two-dimensional curve is defined by a pair of functions $x(u)$ and $y(u)$, $u \in <0,1>$, $u$ is a parameter which can be thought of as related to the speed of movement along the curve, i.e. a monotonic function of time. The offset curve is defined as the set of points $x_o(u)$, $y_o(u)$ having a geometrical distance from said curve, measured on the normal, that is equal to the offset value R:

$$x_o(u) = x(u) - R \frac{y'(u)}{\sqrt{x'(u)^2 + y'(u)^2}} ; \quad (1)$$

$$y_o(u) = y(u) + R \frac{x'(u)}{\sqrt{x'(u)^2 + y'(u)^2}} .$$

The sign of R (positive or negative) determines the side of the offset curve relative to the curve $x(u)$, $y(u)$. The offset curve can be approximated by a set of polynomials $p_x(u)$ and $p_y(u)$. If they are chosen according to Hermite's formula, they will satisfy collocation and first degree osculation at n points along the curve, i.e. for $p_x(u)$:

$$p_x(u_k)=x_o(u_k); \ p_x'(u_k)=x_o'(u_k); \ k=0,\ldots,n. \quad (2)$$

The order of the polynomials is $2n+1$. The formulas for the second curve, the y-curve, are analogous and will, therefore, be shown here and in the following only when necessary. Hermite's formula is given by:

$$p_x(u) = \sum_{i=0}^{n} H_i(u)x_o(u_i) + \sum_{i=0}^{n} K_i(u)x_o'(u_i); \quad (3)$$

$$H_i(u) = [1 - 2L_i'(u_i)(u - u_i)]L_i(u)^2;$$

$$K_i(u) = (u - u_i)L_i(u)^2;$$

$$L_i(u) = \frac{\prod_{k=0, k \neq i}^{n}(u - u_k)}{\prod_{k=0, k \neq i}^{n}(u_i - u_k)} .$$

The functions $L_i$, $H_i$ and $K_i$ have the properties:

$$\begin{aligned}&L_i(u_k)=\delta_{ik}; \ H_i(u_k)=\delta_{ik}; \ H_i'(u_k)=0; \ K_i(u_k)=0; \\ &K_i'(u_k)=\delta_{ik}; \ \delta_{ik}=0 \text{ for } i\neq k; \ \delta_{ik}=1 \text{ for } i=k.\end{aligned} \quad (4)$$

Figure 2:
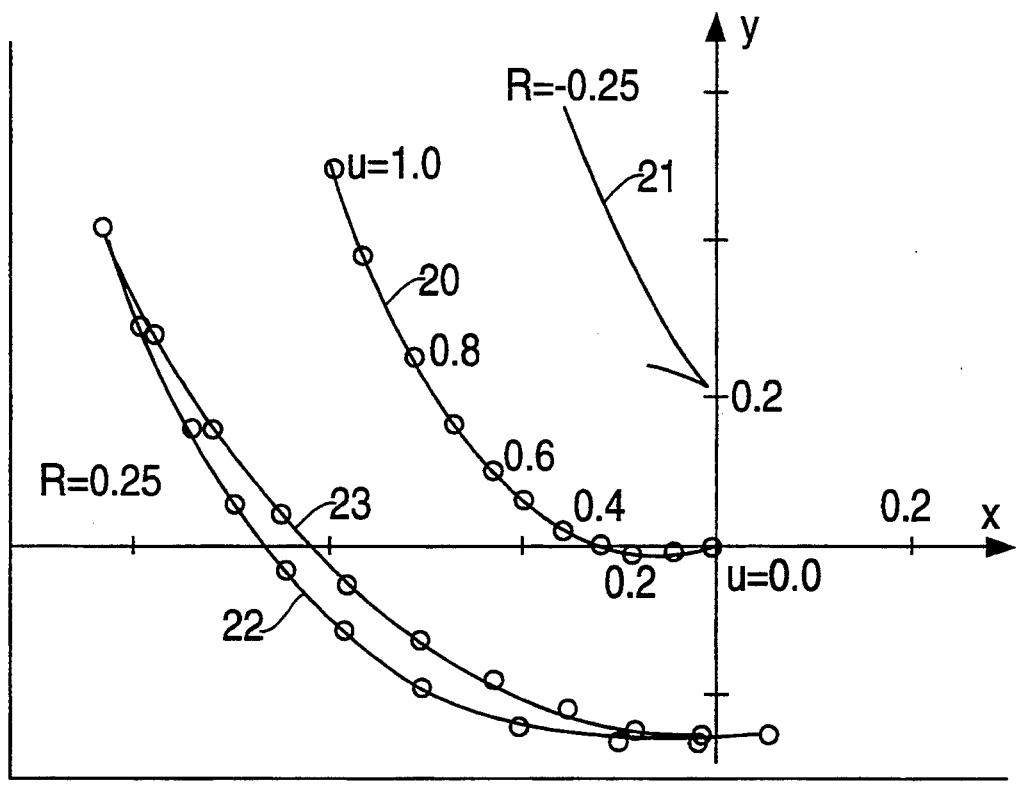
FIG. 2 shows a portion of a 2-dimensional contour curve together with an associated offset curve.

In FIG. 2 a contour curve 20 is shown, parameterized by a spline $x(u) = -0.2u^3 + 0.3u^2 - 0.5u$; $y(u) = 0.4u^3 + 0.2u^2 - 0.1u$; $0 < u < 1$. Two offset curves 21 and 22 are shown with offset values $R = -0.25$ and $R = +0.25$, respectively. The Hermite approximation of the offset curve 22 with offset $+0.25$ is indicated by the curve 23, also a spline from $u_0 = 0$ till $u_1 = 1$.

An important feature of Hermite's formula is that the deviation between the original function $x_o(u)$ and the approximation $p_x(u)$ can be estimated. The deviation is given by:

$$x_o(u) - p_x(u) = \frac{x_o^{(2n+2)}(\xi(u))}{(2n+2)!} \prod_{i=0}^{n}(u - u_i)^2; \quad (5)$$

$$u_0 \leq \xi(u) \leq u_n; \ u \ <u_0, u_n>.$$

$x_o^{(2n+2)}$ denotes the $(2n+2)$nd derivative of the function $x_o(u)$. The function $\epsilon(u)$ is usually undeterminable but the limitation of its value to the interval $<u_0, u_1>$ allows an upper limit of the deviation to be estimated.

For the approximation of the path of the machining tool from the contour data and the offset value it is sufficient to use a number of polynomials of third order to describe the spline segments. For a third order polynomial the deviation is described by:

$$\epsilon_x(u) = x_o(u) - p_x\left(\frac{u-u_0}{\Delta u}\right) = \tag{6}$$

$$\frac{x_o^{(4)}(\xi_x(u))}{4!}(u-u_0)^2(u-u_1)^2;$$

$$\Delta u = u_1 - u_0; \xi_x(u) \quad <u_0, u_1>.$$

The argument $(u-u_0)/\Delta u$ of the polynomial $p_x$ rescales the function to the interval from 0 to 1, which is a usual way to define splines. For a two dimensional curve the analogous expression for $\epsilon_y(u)$ is combined with $\epsilon_x(u)$ for the total deviation $\epsilon_o(u)$ between the two dimensional spline approximation and the offset curve. The estimate for the total deviation is given by:

$$\epsilon_o(u) = \sqrt{\epsilon_x(u)^2 + \epsilon_y(u)^2} \tag{7}$$

The maximum value of $((u-u_0)^2(u-u_1)^2)$ for $u \in <u_0, u_1>$ is equal to $(\Delta u)^4/16$, resulting in the following expression for the maximum value of the deviation:

$$\max [\epsilon_o(u)] \leq \frac{(\Delta u)^4}{4! \cdot 16} \sqrt{\max(x_o^{(4)}(u))^2 + \max(y_o^{(4)}(u))^2} \; ; \tag{8}$$

$$u \quad <u_0, u_1>.$$

This expression exhibits the fact that the maximum error of the approximation depends on the length $\Delta u$ of the spline segment. In order to be able to estimate the error $\epsilon_o(u)$, the fourth derivatives of the offset functions $x_o(u)$ and $y_o(u)$ are to be found. The calculation of these fourth derivatives may be facilitated by choosing a reference frame in which the functions are described in a convenient way. In particular, the x- and y-functions form a vector which can be rotated because the derivative of a rotated vector of functions is the rotated vector of the derivatives of the functions, for a rotation over an angle $\alpha$:

$$x_1^{(n)} = (x \cos \alpha + y \sin \alpha)^{(n)} = x^{(n)} \cos \alpha + y^{(n)} \sin \alpha = (x^{(n)})_1; \; y_1^{(n)} = (-x \sin \alpha + y \cos \alpha)^{(n)} = -x^{(n)} \sin \alpha + y^{(n)} \cos \alpha = (y^{(n)})_1. \tag{9}$$

Herein, the functions with a subscript 1 designate the components of a vector of functions rotated over the angle $\alpha$.

If the contour data is represented in the form of spline segments described by a pair of polynomials $x(u)$ and $y(u)$, or if the data can be converted easily to such a form, a possible convenient rotation is one in which the maximum power in one dimension is reduced, i.e. if the contour data has the form of third order polynomials, a rotation such that $y_1(u)$ is a quadratic polynomial and $y_1^{(3)}=0$ facilitates the calculation. This would reduce the calculation time and provide a better performance for the numerical control device. The magnitude of the rotation angle $\alpha$ to achieve this reduction, can be derived easily by requiring the coefficient of the third order term of either the x- or y-polynomial to be zero.

For estimating an interval $\Delta u$, i.e. the start and end points $u_0$ and $u_1$ of the interval, such that a given preset tolerance value $\epsilon_{max}$ is not exceeded, the formula (8) leads to:

$$\epsilon_o(u) \leq \tag{10a}$$

$$\frac{(\Delta u)^4}{384} \sqrt{2} \; |R| \max_{u \; <u_0, u_0+\Delta u>} \sqrt{f_x^2(u) + f_y^2(u)} \leq \epsilon_{max};$$

or $$\Delta u \leq \left(\frac{384 \epsilon_{max}}{\sqrt{2} \; |R|}\right)^{\frac{1}{4}} \min_{u \; <u_0, u_0+\Delta u>} (f_x^2(u) + f_y^2(u))^{-\frac{1}{8}}. \tag{10b}$$

The functions $f_x(u)$ and $f_y(u)$ are derived from the fourth derivatives of the offset curves $x_o(u)$ and $y_o(u)$ as given in formula (1):

$$x_o^{(4)}(u) = x^{(4)}(u) - R \frac{d^4}{du^4} \cos\Psi(u) = \tag{11}$$

$$R(f_x(u)\cos\Psi(u) - f_y(u)\sin\Psi(u));$$

$$y_o^{(4)}(u) = y^{(4)}(u) + R \frac{d^4}{du^4} \sin\Psi(u) =$$

$$R(f_y(u)\cos\Psi(u) + f_x(u)\sin\Psi(u));$$

$$f_x(u) = -4 \frac{d\Psi}{du} \frac{d^3\Psi}{du^3} - 3\left(\frac{d^2\Psi}{du^2}\right)^2 + \left(\frac{d\Psi}{du}\right)^4 ;$$

$$f_y(u) = -6 \left(\frac{d\Psi}{du}\right)^2 \frac{d^2\Psi}{du^2} + \frac{d^4\Psi}{du^4} ;$$

$$\Psi(u) = -\arctan\left(\frac{x'(u)}{y'(u)}\right) + \text{const.}$$

The function $\Psi(u)$ describes the angular direction of the tangent of the contour curve. The constant, resulting from a possible rotation, is irrelevant for the present purpose as only derivatives of $\Psi(u)$ enter into the expressions for the deviation between the offset curve and its approximation.

Formulas (10a) and (10b) is valid if the contour data are given as third order polynomials. If the fourth derivatives of the functions $x(u)$ and $y(u)$ describing the contour are non-zero, these formulas will exhibit cross terms between $f_x(u)$, $f_y(u)$, $x^{(4)}(u)$ and $y^{(4)}(u)$. The given expressions are independent under rotation of the reference frame, they may be evaluated after performing a convenient rotation.

Having obtained an expression (10a) relating the maximum deviation in a spline segment to the contour data $x(u)$, $y(u)$, the offset value R and the start and end points $u_0$, $u_0+\Delta u$, an embodiment of the numerical control device can be realized by a procedure which is started by using a single spline segment to approximate the whole interval from 0 to 1. In this interval the expression in formula (10a) is evaluated and if the result exceeds a predetermined tolerance value $\epsilon_{max}$ the spline segment is divided in two smaller segments. For each of the segments the evaluation of the expression is repeated and the segment is divided again when the result exceeds the tolerance value. According to this procedure, after a few iterations all spline segments will have a maximum deviation less than the preset tolerance value.

A preferred approach is to consider that formula (10b) directly leads to an approximative error function $\epsilon(u)$ which gives an upper limit of the length of a spline segment $\Delta u$ in which the maximum deviation $\epsilon_{max}$ is not exceeded:

$$\lambda(u) = 4.06 \left(\frac{\epsilon_{max}}{|R|}\right)^{\frac{1}{2}} (f_x^2(u) + f_y^2(u))^{-\frac{1}{2}}. \tag{12}$$

The most important features of this $\lambda(u)$-function are that it does not assume zero and that it is always positive.

The approximation by splines now has to satisfy that for any spline segment the value $\Delta u$ does not exceed the minimum of $\lambda(u)$ in the interval $u_0 \leq u \leq u_0 + \Delta u$. This can be done by following one of several procedures. A first possibility is determining the overall minimum value of $\lambda(u)$ in the interval from $u=0$ to $u=1$ and subsequently dividing the interval in a number of segments of which none has a length $\Delta u$ larger than said minimum. For example the lengths can be equal, or all segments but one can have a length equal to said minimum value. An alternative approach is a binary procedure in which for a particular segment the minimum value of the approximative error function $\lambda(u)$ is determined. If the minimum value of $\lambda(u)$ in the segment is larger than the length of the segment, the maximum deviation is not exceeded. If the length of the segment exceeds the minimum value of $\lambda(u)$, the segment is split in two segments of equal length and for both the same procedure is repeated. As the minimum value of the approximative error function $\lambda(u)$ is non-zero and positive the procedure will always terminate.

Figure 3:
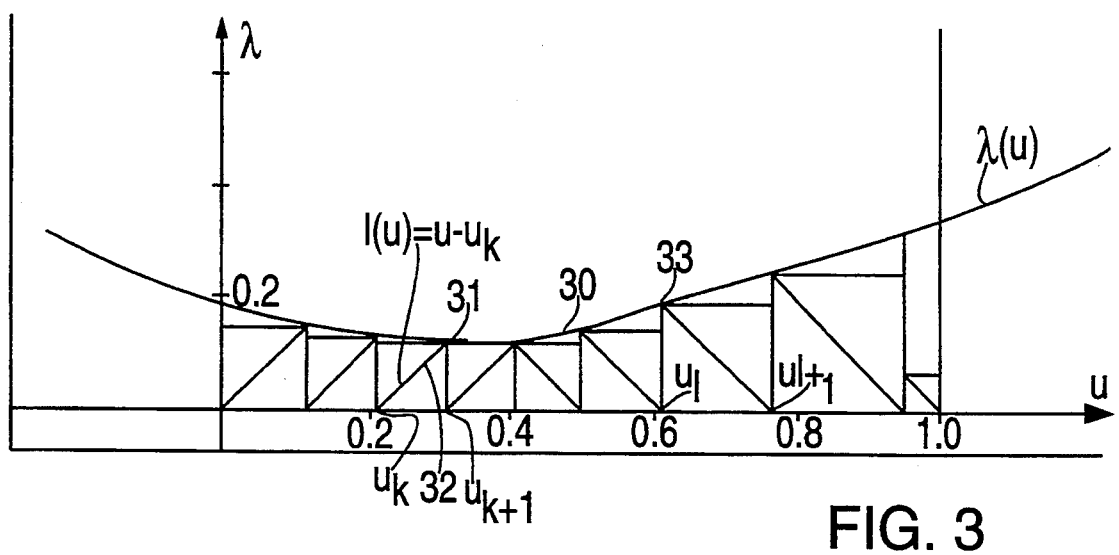
FIG. 3 shows the approximative error function λ(u) for the contour curve shown in FIG. 2 and an illustration of an embodiment to define spline segments lengths.

Preferably, the number of segments should be minimized or the segment's length maximized. An algorithm to achieve this is solving the problem of filling the area under the plot of the $\lambda(u)$-function with as few squares as possible in the interval $0 < u < 1$, the squares covering the whole interval. This is illustrated in FIG. 3 for the approximative error function of the offset curve shown in FIG. 2 for $\epsilon_{max}/R = 10^{-3}$. The $\lambda(u)$-function is indicated by line 30. In an interval, starting with $u_k$, where the function $\lambda(u)$ descends the intersection 31 of a linear function $l(u) = u - u_k$ and $\lambda(u)$ has to be found. The value $u_{k+1}$ of the intersection is the upper limit of the segment. It should be verified that the minimum of the approximative error function in the interval $<u_k, u_{k+1}>$ occurs at $u_{k+1}$. If the approximative error function is increasing as at the point 33 with value $u_l$ the calculation is simpler, in that case $u_{l+1} = u_l + \lambda(u_l)$. Also now it should be verified that the minimum of $\lambda(u)$ occurs at $u_l$. This procedure has the advantage that the spline segments are calculated one after the other. Accordingly, movement of the tool along the curve parameterized by a particular spline segment can coincide with the calculation being performed at the next spline segment.

Implementation of the above described method for calculating splines describing an offset curve when the contour of the workpiece to be produced is given, results in a numerical control device generating control signals to steer a milling tool sufficiently fast that the calculation can be done during the milling operation, even when the numerical control device is provided with limited resources. A realized embodiment, in which the numerical control device comprised an Intel 80386 microprocessor as a central controller and an Intel 80387 coprocessor yielded acceptable results. The amount of memory needed for the determination of the spline parameterizations was limited to several tens of kilobytes.

What is claimed is:

1. A numerical control device for controlling movement of a tool, steerable by a steering device, along a tool path to create a contour on a workpiece, said numerical control device comprising:

input means for receiving (i) contour data representing the contour desired on the workpiece and (ii) offset data representing the offset between a reference point on the tool and a working edge of the tool engaging the workpiece;

calculating means for calculating the tool path from said contour data and said offset data, said calculating means including parameterizing means for generating a plurality of spline segments parameterizing the tool path, each spline segment including end points having positions and slopes derived from said contour data and said offset data; and control signal generating means for generating control signals for the steering device to steer the tool along the calculated tool path, said control signal generating means generating control signals for a portion of said tool path prior to said parameterizing means generating all of the spline segments for the tool path, said input means being receptive, after the control signal generating means begins generating control signals, of at least one of (i) revised contour data and (ii) revised offset data for the portion of the tool path for which control signals have not been generated, said calculating means parameterizing the tool path for the remaining portion of the tool path for which control signals have not been generated using revised data received by the input means;

wherein said calculating means further includes approximating means for approximating each spline segment by a mathematical equation such that a maximum deviation between said tool path and said calculated tool path defined by said mathematical equation is directly derivable as said calculated tool path is being determined; and wherein said contour data is in the form of parameters describing a multiple differential equation, and said calculating means includes means for receiving said parameters describing said multiple differential equation, means for determining from said contour data and said offset data an estimated maximum error ($\epsilon_{max}$) between said tool path and said calculated tool path, determining means for determining the length of said spline segments, reducing means for reducing the length of said spline segments if said estimated maximum error exceeds a predetermined tolerance and wherein said approximating means approximates each spline segment with a polynomial.

2. The numerical control device as claimed in claim 1, wherein said calculating means further includes approximative error equation determining means for determining, from said contour data and said offset value, an approximative error equation ($\lambda(u)$), wherein said estimated maximum error of a respective one of the spline segments does not exceed the value of said approximative error equation on a portion of said tool path corresponding to said respective spline segment.

3. The numerical control device as claimed in claim 2, wherein said estimated maximum error for said respective spline segment is substantially equal to the value of said approximative error equation on a portion of said tool path corresponding to said respective spline segment.

4. The numerical control deice as claimed in claim 2, wherein said determining means determines the length of said spline segments such that for each spline segment the ratio between said estimated maximum error and said approximative maximum error equation throughout each spline segment is substantially equal.

5. The numerical control device as claimed in claim 1, wherein said contour data is in the form of parameters of third order polynomials, and said calculation means includes means for receiving the parameters of said third order polynomials.

* * * * *